UNITED STATES PATENT OFFICE.

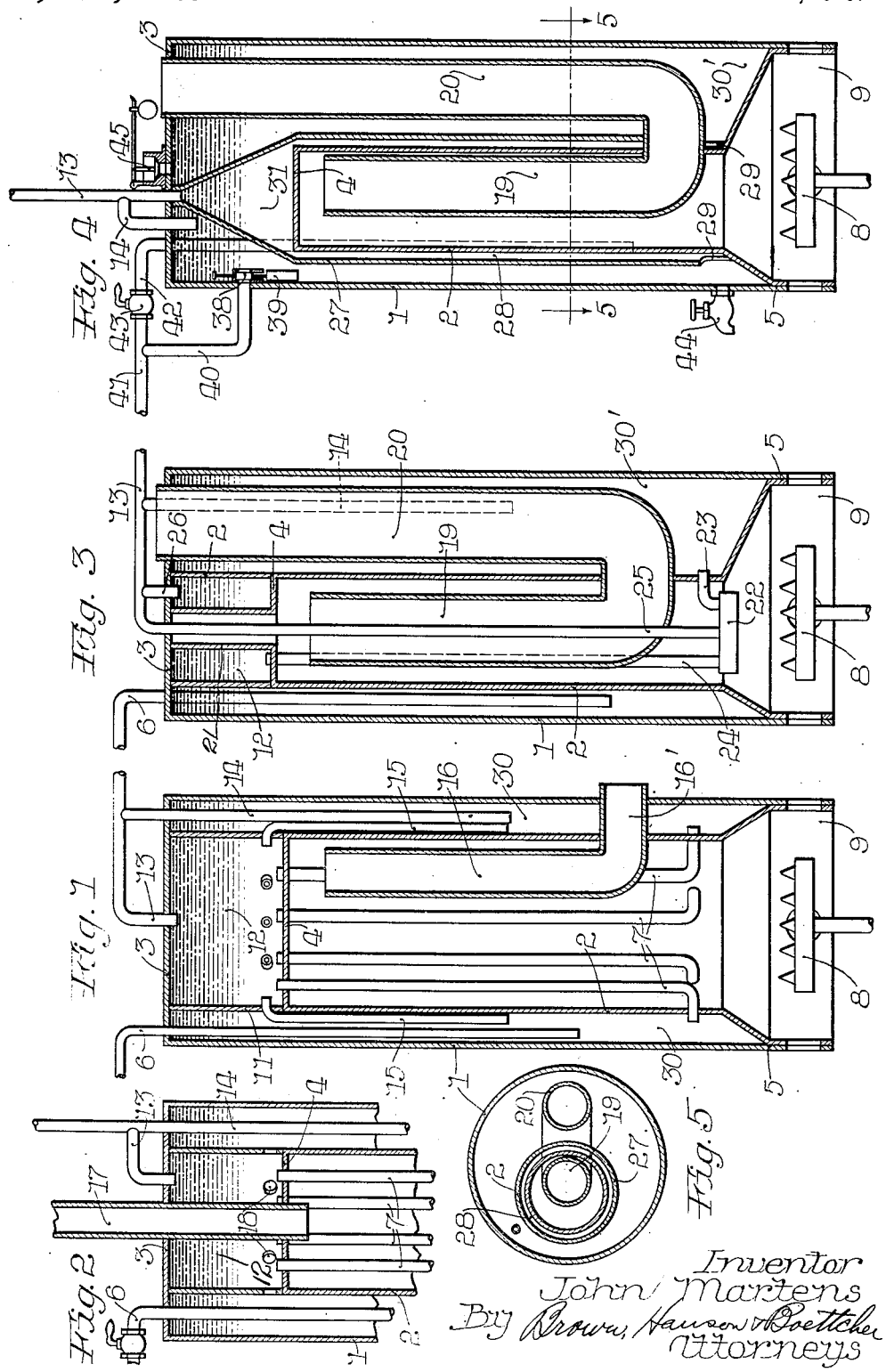

JOHN MARTENS, OF CHICAGO, ILLINOIS.

WATER-HEATER.

1,323,302.   Specification of Letters Patent.   Patented Dec. 2, 1919.

Application filed November 20, 1916. Serial No. 132,335.

*To all whom it may concern:*

Be it known that I, JOHN MARTENS, a citizen of the United States, residing at Chicago, in the county of Cook and State of Illinois, have invented a certain new and useful Improvement in Water-Heaters, of which the following is a full, clear, concise, and exact description, reference being had to the accompanying drawings, forming a part of this specification.

My invention relates to a water heater such as is generally employed for heating water for domestic purposes and the like.

The object of the invention is to provide an improved structure which will make possible the production of a small quantity of hot water in very short time with a corresponding increase in the amount of water heated depending upon the length of time that heat is applied.

To this end I employ a structure which forms or defines a relatively small chamber within the body of the main heater, this chamber being adapted to receive the hot water as quickly as it is formed, always retaining a certain amount of hot water and in case more heat is applied than is necessary to heat this relatively small body of water a circulation with the main body of water is set up.

For the purpose of heating the water rapidly I provide means such as water pipes, coils or the like, for isolating a small quantity of water from the main body of water contained in the heater and subject this to the heat of a burner, discharging the heated water into the chamber which traps the same. The chamber which traps the hot water may be in the form of a closed compartment or it may be in the form of an inverted cup having connection with a baffle shell which directs the hot water thereinto or in any other suitable form for performing this function of trapping the hot water and permitting the circulation of an excess of hot water.

I shall now describe my invention in connection with the accompanying drawings which form a part of the specification in order to inform those skilled in the art how to embody my invention in practical form.

Figure 1 is a vertical central section through a water heater, illustrating one manner of embodying my invention;

Fig. 2 is a similar view with parts broken away showing a modified form of chamber;

Fig. 3 is a view similar to Fig. 1 of a modification, and

Fig. 4 is a similar view of another modification illustrating additional mechanism for converting the water heater into a vapor generator; and Fig. 5 is a cross sectional view of Fig. 4 taken on the line 5—5 thereof.

The main body of the heater is formed of a pair of concentric shells 1 and 2 which form between them a suitable water space. The tops of the shells are closed at 3 and 4 respectively to form a water space which is a continuation of the space between the side walls 1 and 2. The side walls 1 and 2 are joined together at their lower ends as indicated at 5 thereby forming a suitable container between the inner and outer shells for containing water to be heated. A cold water supply pipe 6 enters the outer shell and discharges cold water near the bottom of the water leg 30 formed between the shells 1 and 2. I have illustrated the cold water pipe as being introduced from the top of the outer shell 1 but it is obvious that the cold water may be introduced by a pipe entering the side walls at any other point. Within the inner shell 2·I dispose a plurality of water tubes 7 which have their lower ends connected to the water leg 30 near the bottom of the shells 1 and 2 and their upper ends projecting through the top 4 of the inner shell 2. A suitable burner 8 preferably for burning gas is disposed in such position in the fire box 9 as to discharge its heat into the inner shell 2. The fire box 9 may be formed of a continuation of the outer shell 1 or may be formed in any other suitable manner.

In the form shown in Fig. 1 I provide a cylindrical shell 11 which is disposed between the tops 3 and 4 of the outer and inner shells respectively and which defines a chamber 12 in which the hot water from the tubes 7 is trapped. A discharge pipe 13 communicates with the upper zone of the chamber 12 and conducts the heated water therefrom to the service taps. An extension pipe 14 connects with the discharge pipe 13 above the heater and projects down into the water leg 30 formed between the shells 1 and 2. A plurality of circulating tubes 15 are circumferentially arranged around the shell 11 and open into the lower zone of the chamber 12.

The flue illustrated in Fig. 1 comprises a vertical downdraft section 16, terminating adjacent the top of the inner shell, and a lateral extension 16' of the same which projects through the inner and outer shells and discharges the gases of combustion into a chimney or conducts them to some auxiliary heat exchange body.

The burner 8 heats the water in the tubes 7 much more quickly than it heats the body of water contained between the shells 1 and 2. As a consequence the water in the tubes 7 rises as it is heated, and discharges into the chamber 12 and a corresponding amount of water is circulated from the chamber 12 through the pipes 13 and 14, and circulating tubes 15. By reason of its diminished density, the heated water emerging from the tubes 7, does not circulate into the circulating tubes 15 but ascends directly to the top of the chamber 12 where it accumulates until practically the entire chamber 12 is filled, when the lower strata of heated water discharges out through the circulating tubes 15 and the bottom of the pipe 14. Thus the chamber 12 becomes filled with hot water before any of the hot water which is discharged from the tubes 7 becomes dissipated in the main body of water in the heater. If the fire remains on, hot water will be discharged through the pipes 14 and 13 and tubes 15 transmitting its heat to the main body of water surrounding the inner shell 2. Any heat that escapes through the walls 11 of the chamber 12 is not lost but is imparted to the main body of water in the heater.

In Fig. 2 I have illustrated a modification in which a central flue 17 is employed. This flue projects down through the top wall 3 of the outer shell and the top wall 4 of the inner shell. Thus the water that is discharged from the tubes 7 into the chamber 12 is further heated by contact of the fire gases against the sides of the flue 17 where it passes through the chamber 12.

The walls 11 of the chamber 12 are provided with apertures 18 in place of the tubes 15 for permitting circulation, the colder water in the chamber 12 dropping down and escaping through the apertures 18 into the main body of water.

In Fig. 3 I have shown a heater in which the inner shell 2 is eccentrically disposed relative to the outer shell 1, as more clearly shown in Fig. 5. The downdraft flue 19 communicates with an updraft flue 20 which extends up through the enlarged water leg 30' obtained by this eccentric disposal, and out through the top 3 of the outer shell 1. The chamber 12 has a reduced continuation 21 of the inner shell 2 extending therethrough, which is sealed over by the top 3 of the outer shell. A water block 22 is disposed immediately below the lateral bend of the downdraft flue 19 and is connected to the water leg 30' by the short pipe 23. A heating tube 24 rises vertically from the water block and discharges into the chamber 12. Another heating tube 25 rises vertically from the water block through the flue 19 and the continuation 21 and connects with the discharge pipe 13. A short extension pipe 26 connects the upper zone of the chamber 12 with the discharge pipe 13.

The hot gases rising in the inner shell are momentarily retarded in the upper end of the shell, due to their buoyancy, before descending through the downdraft flue. At this point they ascend and are trapped in the upper end of the shell 2 and in the continuation 21 where they release their heat partly through the top wall 4 and partly through the continuation 21 to the water in the chamber 12. By disposing the updraft flue in the water leg 30' a substantially complete transference of heat is made from the exhausting gases to the water leg. The water block 22, situated immediately above the burner 8, generates hot water rapidly and the heating tubes 24 and 25 conduct this hot water to the chamber 12, from whence it circulates through the extension pipe 26, discharge pipe 13, down through the pipe 14 into the main body of water and reënters the water block 22. The heating tube 25, in direct connection with the discharge pipe 13, is capable of delivering limited quantities of hot water very quickly.

It is not essential that water tubes 7 be employed and in Fig. 4 I have shown a modification in which a shell 27 surrounds the inner shell 2 thereby segregating a small quantity of water and subjecting it to the heat of the burner.

This baffle shell 27 provides a small water space 28 which is connected to the water leg 30' through the openings 29 which are formed in the lower part of the side wall of the shell 27. At its upper end the water space 28 opens into the conical cup portion 31 of the shell 27. This cup portion 31 is equivalent to the chamber 12 of the other figures, for trapping the heated water. The circulation is up through the water space 28, into the cup portion 31, through the pipes 13 and 14, and down through the main body of water to the bottom of the shell 27.

It is at once apparent that the water space 28 performs the same function in this modification as do the water tubes 7 in the other forms.

Fig. 4 also illustrates the mechanism by which any of the boilers above illustrated may be converted from water heaters to vapor generators.

A valve 38 controlled by a float 39 is connected by a pipe 40 to the cold water supply pipe 41. Another branch 42 is controlled by the manually controlled valve 43. When the boiler is in normal operation as a water heater the valve 43 is opened.

When the boiler is to be operated as a vapor generator the valve 43 is closed and the drain cock 44 at the bottom of the boiler is opened just long enough to bring the level of the water down approximately equal to the level of the valve opening to provide space for steam generation. The level maintained by the float 39 will be just above the level of the top wall 4, which constitutes the uppermost heating surface and which should be kept covered with water.

The water is then heated to the point of forming steam, all of the heating surfaces at this time being covered with water. When the water level drops the float controlled valve 38 opens and thus the level is maintained at the point desired without any further attention.

The steam is conducted to its point of use through the discharge pipe 13 opening into the cup portion 31 and the connected extension pipe 14 opening into the water space between the shells. A suitable safety valve 45 is provided to relieve the heater of destructive steam pressures.

The dimensions and proportions which I have illustrated are not essential. Many modifications of embodiment are possible under my invention.

I claim:

1. The improvement herein described comprising a water heater, having an outer shell and an inner shell, a cold water receiving chamber between the side walls of the two shells, the lower end of the inner shell being adapted to house a burner, a relatively small hot water chamber above the upper end of the inner shell within the outer shell and spaced from the side wall of the outer shell, means for subjecting a relatively small quantity of water at a time to the heat of the burner, said means comprising water circulating means for receiving the cold water from the cold water receiving chamber and delivering it in heated condition to said hot water chamber, and an exhaust flue for the gases of combustion leading from the upper end of the inner shell down through said inner shell and out and up through the water space between said shells.

2. The improvement herein described, comprising a water heater having an outer shell and an inner shell, said inner shell being eccentrically disposed in said outer shell, a cold water receiving chamber between the side walls of the two shells, a relatively small hot water chamber above the upper end of the inner shell within the outer shell, water circulating means for receiving the cold water from the cold water receiving chamber and delivering it in heated condition to said hot water chamber, and an exhaust flue leading down through said inner shell from the upper portion thereof, said exhaust flue extending through the side wall of said inner shell and passing longitudinally up between said shells in the larger portion of said cold water receiving chamber.

In witness whereof I hereunto subscribe my name this 16th day of November, A. D. 1916.

JOHN MARTENS.